United States Patent
Cuccia

Patent Number: 5,818,934
Date of Patent: Oct. 6, 1998

[54] METHOD AND APPARATUS FOR PROVIDING A CRYPTOGRAPHICALLY SECURE INTERFACE BETWEEN THE DECRYPTION ENGINE AND THE SYSTEM DECODER OF A DIGITAL TELEVISION RECEIVER

[75] Inventor: David William Cuccia, Hopewell Junction, N.Y.

[73] Assignee: Phillips Electronics North America Corporation, New York, N.Y.

[21] Appl. No.: 768,489

[22] Filed: Dec. 18, 1996

[51] Int. Cl.[6] .............................. H04K 1/02; H04K 1/04; H04K 1/06; H04N 7/167
[52] U.S. Cl. ................................... 380/9; 380/10; 380/35; 380/36; 380/37
[58] Field of Search ............................... 380/9, 10, 35–37

[56] References Cited

U.S. PATENT DOCUMENTS

| | | | |
|---|---|---|---|
| 4,944,006 | 7/1990 | Citta et al. | 380/20 |
| 5,535,275 | 7/1996 | Sugisaki et al. | 380/10 |
| 5,689,569 | 11/1997 | Peyret | 380/49 |

*Primary Examiner*—Thomas H. Tarcza
*Assistant Examiner*—Hrayr A. Sayadian
*Attorney, Agent, or Firm*—Laurie E. Gathman

[57] ABSTRACT

A method for providing a secure interface between a decryption engine and a system decoder of a digital receiver, e.g., an MPEG-2 digital television receiver. The system decoder receives an encrypted bitstream and produces a cipher text bitstream which is supplied to the decryption engine via a first parallel data bus which includes a plurality N of parallel bit lines corresponding to respective N bits of the cipher text bitstream. The decryption engine decrypts the cipher text bitstream and produces a plain text bitstream which is supplied to the system decoder via a second parallel data bus which includes a plurality N of parallel bit lines corresponding to respective N bits of the plain text bitstream. The method includes the steps of scrambling the bit order of the N bits of the cipher text bitstream on the respective N bit lines of the first data bus, to thereby produce a scrambled cipher text bitstream N-bits wide, descrambling the bit order of the N bits of the scrambled cipher text bitstream, to thereby produce a descrambled cipher text bitstream which is the same as the original cipher text bitstream, employing the decryption engine to decrypt the descrambled cipher text bitstream, to thereby produce the plain text bitstream, scrambling the bit order of the N bits of the plain text bitstream on the respective N bit lines of the second data bus, to thereby produce a scrambled plain text bitstream N-bits wide, and descrambling the bit order of the N bits of the scrambled plain text bitstream, to thereby produce a descrambled plain text bitstream which is the same as the original plain text bitstream. A digital receiver which implements this method is also disclosed.

50 Claims, 1 Drawing Sheet

METHOD AND APPARATUS FOR PROVIDING A CRYPTOGRAPHICALLY SECURE INTERFACE BETWEEN THE DECRYPTION ENGINE AND THE SYSTEM DECODER OF A DIGITAL TELEVISION RECEIVER

BACKGROUND OF THE INVENTION

The present invention relates generally to security measures for digital receivers, and more particularly, to a method and apparatus for providing a cryptographically secure interface between the decryption engine and the system decoder of a digital television receiver.

A variety of systems have been developed to prevent piracy of digital television signals in present and future cable or satellite subscription digital television systems (e.g., digital television systems based on the MPEG-2 digital video compression standard, as described in the ISO/IEC 13818 document, such as the ATSC Digital Television Standard). In general, the digital television signals are encrypted by the service provider prior to transmission, and then decrypted upon reception. Typically, a system subscriber is provided with a digital television receiver which includes a decryption engine (contained in either a separate set-top box or integrated within the digital television receiver itself) connected between the cable feed or satellite receiver and the subscriber's television set. There are several well-known encryption algorithms which can be utilized, including the Diffie-Hellman, RSA (Rivest-Shamir-Adleman), and DES (Data Encryption Standard) encryption algorithms.

In public key encryption systems for digital television systems (and other types of digital data delivery systems), the decryption engine decrypts the encrypted television signal received by the digital television receiver in accordance with the corresponding decryption algorithm, using both a public key which depends upon the particular encryption algorithm employed, and a private key which is unknown and concealed within the decryption engine. The integrity of the security afforded by such systems depends upon preservation of the secrecy of the private key. If a pirate (attacker) is able to discover the private key, then it becomes a routine matter for the skilled pirate (an individual or company which has the capability to reverse engineer the decoder and decryption chips in the set-top box) to make other "bootleg" decryption chips and then incorporate them into "black boxes" that enable the reception of programming by a non-subscriber (i.e., a person who does not pay any subscription fees to the service provider).

In encryption systems for digital television systems (and other types of digital data delivery systems), there are two levels of encryption used public key encryption, and private key encryption. The bulk of the data is encrypted using a private key encryption (e.g. block ciphers like DES), owing to the speed of private key encryption. Sessions of the data transmission (typically, a session is several milliseconds of transmitted data) are encrypted with the block cipher using different private keys, called session keys; each session has its own private key. The session keys themselves are typically encrypted with a public key encryption system, wherein only the user holding the user private key of the public key system can decrypt, and thereby recover, the session key, which session key is used for decrypting the session of the transmitted data. The integrity of the security afforded by such a system depends mainly on the preservation of the secrecy of the user private key, and to a some extent on the secrecy of any one session key. If a pirate (attacker) is able to discover the user private key, then it becomes a routine matter for the skilled pirate (an individual or company which has the capability to reverse engineer the decoder and decryption chips in the set-top box, or digital data receiver) to make other "bootleg" decryption chips and then incorporate them into "black boxes" that enable the reception of programming by a non-subscriber (i.e., a person who does not pay any subscription fees to the service provider).

The most secure method of implementing the decryption engine is to integrate the decryption engine onto the same die as the system decoder to thereby provide an integrated circuit (IC). For example, for a receiver processing MPEG-2 Transport Streams, a system decoder de-multiplexes the Packetized Elementary Streams (PES) from the Transport Stream. In MPEG-2 type streams, it is possible to (a) take PES packets and form Transport Packet from them. The Transport Packets can then be encrypted. It is also possible to (b) encrypt the PES packets, then from the encrypted PES packet form Transport Packets, which are delivered as is. Lastly, it is possible to (c) encrypt data in PES packets, then form Transport Packets from the encrypted PES data, and have each Transport Packet payload encrypted again. If method (a) is used, then the digital receiver should decrypt the Transport Packet payload first, then perform the de-multiplexing required to recover the PES packet (decryption before de-multiplexing). If method (b) is used, the digital receiver should de-multiplex the Transport Packets to form the encrypted PES packet, then decrypt the PES packet (decryption after de-multiplexing). If method (c) is used, then decryption before and after de-multiplexing will be required. By integrating the decryption engine onto the same die as the system decoder, the system decoder and decryption engine are connected by wiring internal to the IC, using specialized masks and layouts which make reverse engineering of the decryption engine very difficult. However, such a hard-wired IC does not afford a great deal of flexibility to the system designer, since it can not be modified and thus, can support only a single encryption scheme, to the exclusion of all others. Thus, separate ICs which are specifically designed to support different, respective encryption algorithms must be employed for services which utilize different encryption algorithms.

A more flexible method of implementing the decryption engine is to use a general purpose digital signal processing device (e.g., a field programmable gate/logic array (FPGA or FPLA) or ASIC core) which can be reconfigured with software to support different encryption algorithms. However, this technique will significantly degrade the security of the system, since the system becomes vulnerable to software and hardware attacks.

Another method of implementing the decryption engine is to implement the decryption engine and the system decoder on separate chips, so that the decryption engine is off-chip from the system decoder. In this way, different decryption engines may be utilized by simply substituting chips. However, although this is a particularly flexible method of implementing the decryption engine, the system security is compromised due to the exposure of the interconnect between the system decoder and the decryption engine to the outside world, and the resultant vulnerability of the exposed interconnect to the following type of attack. Namely, an attacker can read the cipher text (i.e., the encrypted bitstream) from the interconnect (e.g., from a first parallel or serial data bus), and the corresponding plain text (i.e., the decrypted bitstream) from the interconnect (e.g., from a second parallel or serial data bus). Access to the cipher text and plain text enables an attacker to perform known-plain text, and chosen cipher text attacks on the decryption engine in an attempt to recover all or part of the private key. In general, an attack to recover the private key or the entitlement key of a decryption scheme is known as cryptanalysis. A special subset of cryptanalysis is called differential cryptanalysis, and is effective on the DES encryption/decryption scheme. With an exposed interface, an attacker could employ a chosen-cipher text attack so that a differential cryptanalysis could be performed on the decryption engine, thereby recovering the entitlement key. Furthermore, an exposed interface allows an attacker to employ laboratory equipment to supply cipher text and measure corresponding plain text without difficulty. Under such conditions, an attacker needs to know only the encryption scheme employed, and the public key of the service provider and/or of the client (subscriber).

Further, if the data delivery service is interactive, i.e., allows subscriber feedback via a two-way communication link, then the individual subscriber's set-top box is provided with an encryption engine and a transmitter, so that the subscriber can input data (e.g., via a keypad) which is encrypted and "signed" for authentication with the private key prior to transmission. Thus, the attacker who uncovers the private key can also use the private key to impersonate the legitimate subscriber.

Based on the above and foregoing, it can be appreciated that there presently exists a need in the art for a method and apparatus for providing a cryptographically secure interface between the decryption engine and the system decoder of a digital television receiver which is more robust than is possible with the presently available technology, and which provides a very high cost-to-reward ratio for any attacker attempting to "break into" the system.

In this regard, there is a particular need in the art for a method and apparatus which makes it very difficult (or impossible) for an attacker to obtain sufficient information from an exposed interconnect between the decryption engine and the system decoder of a digital television receiver, or any other type of digital data receiver (i.e., more broadly, a digital receiver). The present invention fulfills this need in the art.

SUMMARY OF THE INVENTION

The present invention encompasses a method for providing a secure interface between a decryption engine and a system decoder of a digital receiver, e.g., an MPEG-2 digital television receiver. The system decoder receives an encrypted bitstream and produces a cipher text bitstream which is supplied to the decryption engine via a first parallel data bus which includes a plurality N of parallel bit lines corresponding to respective N bits of the cipher text bitstream. The decryption engine decrypts the cipher text bitstream and produces a plain text bitstream which is supplied to the system decoder via a second parallel data bus which includes a plurality N of parallel bit lines corresponding to respective N bits of the plain text bitstream.

The method includes the steps of scrambling the bit order of the N bits of the cipher text bitstream on the respective N bit lines of the first data bus, to thereby produce a scrambled cipher text bitstream N-bits wide, descrambling the bit order of the N bits of the scrambled cipher text bitstream, to thereby produce a descrambled cipher text bitstream which is the same as the original cipher text bitstream, employing the decryption engine to decrypt the descrambled cipher text bitstream, to thereby produce the plain text bitstream, scrambling the bit order of the N bits of the plain text bitstream on the respective N bit lines of the second data bus, to thereby produce a scrambled plain text bitstream N-bits wide, and, descrambling the bit order of the N bits of the scrambled plain text bitstream, to thereby produce a descrambled plain text bitstream which is the same as the original plain text bitstream.

The step of scrambling the bit order of the N bits of the cipher text bitstream is performed in accordance with a first bit-scrambling algorithm, and the step of scrambling the bit order of the N bits of the plain text bitstream is performed in accordance with a second bit-scrambling algorithm. The first and second bit-scrambling algorithms may either be the same or different.

In a preferred embodiment of the present invention, the first bit-scrambling algorithm is a different one of a plurality of possible first bit-scrambling algorithms for each of a plurality of successive power-up cycles of the digital receiver, and the second bit-scrambling algorithm is a different one of a plurality of different possible second bit-scrambling algorithms for each separate power-up cycle of the digital receiver.

The step of descrambling the bit order of the N bits of the scrambled cipher text bitstream is performed in accordance with a first bit-descrambling algorithm which is the inverse of the first bit-scrambling algorithm, and the step of descrambling the bit order of the N bits of the scrambled plain text bitstream is performed in accordance with a second bit-descrambling algorithm which is the inverse of the second bit-scrambling algorithm.

Further, the step of scrambling the bit order of the N bits of the cipher text bitstream is synchronized with the step of descrambling the bit order of the N bits of the scrambled cipher text bitstream, and the step of scrambling the bit order of the N bits of the plain text bitstream is synchronized with the step of descrambling the bit order of the N bits of the scrambled plain text bitstream.

The present invention also encompasses a digital receiver which includes a system decoder for receiving an encrypted bitstream and producing a cipher text bitstream, a decryption engine for decrypting the cipher text bitstream and producing a plain text bitstream, a first parallel data bus which includes a plurality N of parallel bit lines coupled between a parallel output port of the system decoder and a parallel input port of the decryption engine, a second parallel data bus which includes a plurality N of parallel bit lines coupled between a parallel output port of the decryption engine and a parallel input port of the system decoder.

The system decoder includes a cipher text scrambler module for scrambling the bit order of N bits of the cipher text bitstream on the N bit lines of the first data bus, to thereby produce a scrambled cipher text bitstream N-bits wide which is supplied to the parallel input port of the decryption engine via the first parallel data bus.

The decryption engine includes a cipher text descramble module for descrambling the bit order of the N bits of the scrambled cipher text bitstream, to thereby produce a descrambled cipher text bitstream which is the same as the original cipher text bitstream.

The decryption engine further includes a plain text scramble module for scrambling the bit order of N bits of the plain text bitstream on the N bit lines of the second data bus, to thereby produce a scrambled plain text bitstream N-bits wide which is supplied to the parallel input port of the system decoder via the second parallel data bus. The system decoder further includes a plain text descramble module for descrambling the bit order of the N bits of the scrambled plain text bitstream, to thereby produce a descrambled plain text bitstream which is the same as the original plain text bitstream.

In a presently preferred embodiment, the first and second parallel data busses are at least partially exposed to the outside world, and the system decoder and the decryption engine are embodied in separate first and second chips. Further, the cipher text scramble module and the cipher text descramble module are preferably implemented as complementary first and second state machines (e.g., a combination of linear feedback shift registers), respectively, and the plain text scramble module and the plain text descramble module are preferably implemented as complementary third and fourth state machines, respectively.

Additionally, the system decoder and the decryption engine are preferably coupled to a common power source and are power-cycled together, whereby the first and second state machines synchronously cycle through respective sequences of complementary first and second states over a plurality of successive power-up cycles, and the third and fourth state machines synchronously cycle through respective sequences of complementary third and fourth states over a plurality of successive power-up cycles.

The present invention also encompasses several other variations and alternative embodiments of the above-described digital receiver and method which are described in detail hereinafter.

BRIEF DESCRIPTION OF THE DRAWINGS

These and various other features and aspects of the present invention will be readily understood with reference to the following detailed description read in conjunction with the accompanying drawings, in which.

DETAILED DESCRIPTION OF THE INVENTION

Figure 1:
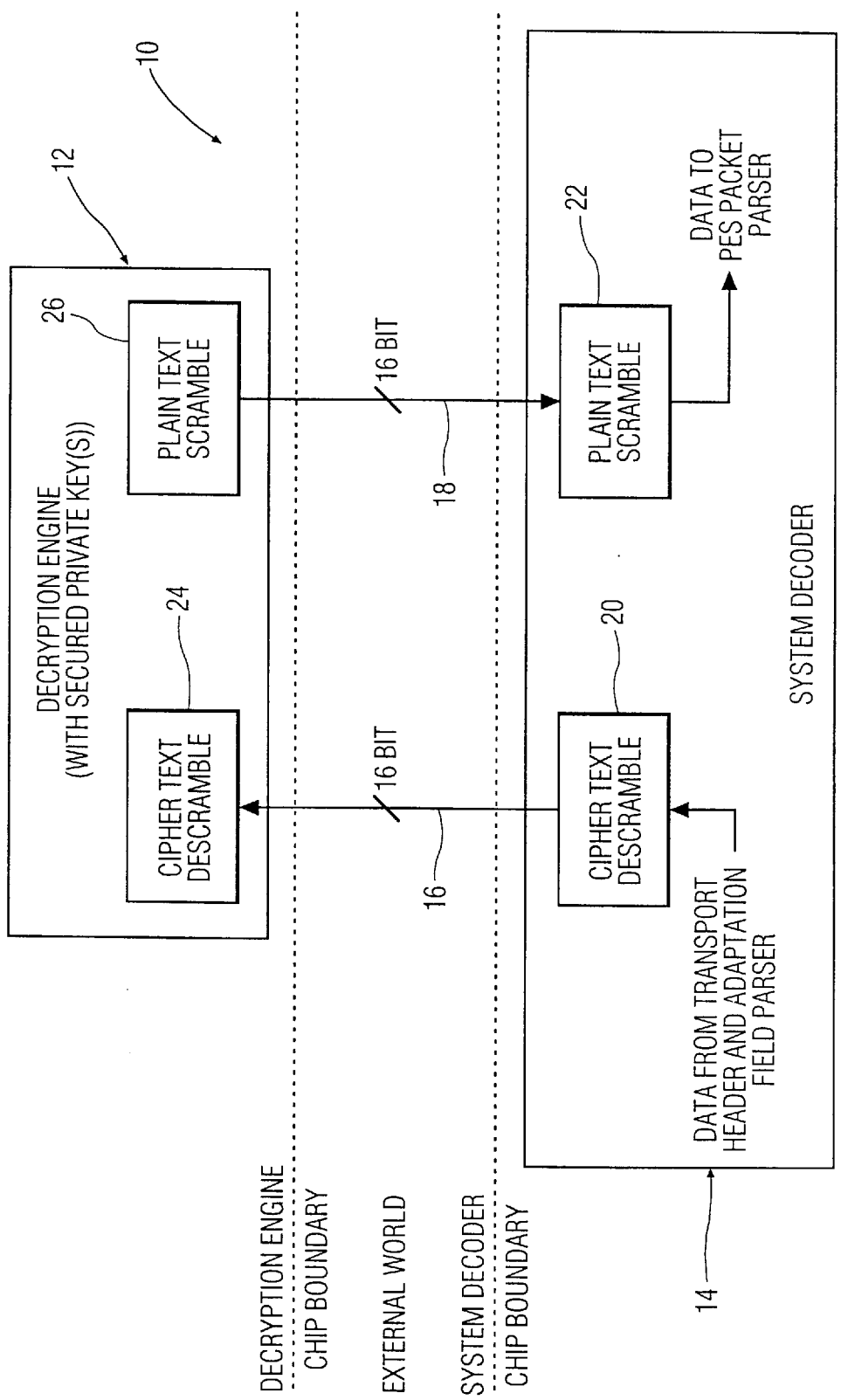
FIG. 1 is a block diagram of a part of a digital television receiver including an apparatus according to a preferred embodiment of the present invention for providing a cryptographically secure interconnect between the decryption engine and system decoder of the digital television receiver.

With reference now to FIG. 1, a method and apparatus for providing a cryptographically secure interface between the decryption engine and the system decoder of a digital television receiver in accordance with a presently preferred embodiment of the instant invention will now be described. More particularly, a digital receiver 10, e.g., an MPEG-2 digital television receiver, includes a decryption engine 12 and a system decoder 14 which communicate with one another via a pair of data busses 16, 18, e.g., 16-bit wide parallel data busses, which together comprise the interconnect between the decryption engine 12 and the system decoder 14. In accordance with the present invention, the system decoder 14 includes, in addition to its usual decoder circuitry, a cipher text scramble circuit or module 20 and a plain text descramble circuit or module 22, and the decryption engine 12 includes, in addition to its usual decryption circuitry, a cipher text descramble circuit or module 24 and a plain text scramble circuit or module 26. The cipher text scramble module 20 of the system decoder 14 and the cipher text descramble module 24 of the decryption engine 12 communicate via the 16-bit wide parallel bus 16, and the plain text scramble module 26 of the decryption engine 12 and the plain text descramble module 22 of the system decoder 14 communicate via the 16-bit wide parallel bus 18.

In accordance with the present invention, the bit order (bit position) of the bits comprising the cipher text bitstream (i.e., the encrypted digital television signal received by the digital television receiver 10) is scrambled by the cipher text scramble module 20 of the system decoder 14, in accordance with any suitable bit-scrambling algorithm. For example, the odd-numbered bits of the cipher text bitstream could be placed on the even-numbered bit lines of the parallel data bus 16, and the even-numbered bits of the cipher text bitstream could be placed on the odd-numbered bit lines of the parallel data bus 16. Of course, the particular bit-scrambling algorithm employed in scrambling the bit order of the cipher text bitstream is not in any way limiting to the present invention.

The cipher text descramble module 24 of the decryption engine 12 then functions to descramble the bit order of the scrambled cipher text bitstream received over the parallel data bus 16 by executing a bit-descrambling algorithm which is the inverse of the bit-scrambling algorithm executed by the cipher text scramble module 20 of the system decoder 14. The descrambled cipher text bitstream is then decrypted in the normal manner by the decryption engine 12 to thereby produce a plain text bitstream.

In further accordance with the present invention, the bit order of the bits comprising the plain text bitstream produced by the decryption engine 12 is scrambled by the plain text scramble module 26 of the decryption engine 12, in accordance with any suitable bit-scrambling scheme. For example, the odd-numbered bits of the plain text bitstream could be placed on the even-numbered bit lines of the parallel data bus 18, and the even-numbered bits of the plain text bitstream could be placed on the odd-numbered bit lines of the parallel data bus 18. Of course, the particular bit-scrambling algorithm employed to scramble the bit order of the plain text bitstream is also not in any way limiting to the present invention. In this connection, it will be appreciated that the bit-scrambling algorithm used to scramble the bit order of the cipher and plain text bitstreams may be the same or different.

The plain text descramble module 22 of the system decoder 14 then functions to descramble the bit order of the scrambled plain text bitstream received over the parallel data bus 18 by executing a bit-descrambling algorithm which is the inverse of the bit-scrambling algorithm executed by the plain text scramble module 26 of the decryption engine 12 to thereby produce a descrambled plain text bitstream, which is subsequently processed in the normal manner.

In accordance with another aspect of the present invention, to further increase the cryptographical security of the interconnect between the decryption engine 12 and the system decoder 14, on each power-up of the digital television receiver 10, a bit-scrambling scheme different than the one used on the previous power-up should be used for scrambling the bit order of both the cipher and plain text bitstreams on the data busses 16, 18, respectively. For example, a random or a predetermined one of a plurality of different bit-scrambling schemes could be selected by the cipher text scramble module 20 of the system decoder 14 and the plain text scramble module 26 of the decryption engine 12 on each power-up of the digital television receiver 10.

The only additional requirement for this embodiment of the present invention is that the cipher text scramble module 20 of the system decoder 12 and the cipher text descramble module 24 of the decryption engine 12 be synchronized in such a manner as to run the complementary bit-scrambling/ descrambling algorithms at the same time, at all times, and that the plain text scramble module 26 of the decryption engine 12 and the plain text descramble module 22 of the system decoder 14 be synchronized in such a manner as to run the complementary bit-scrambling/descrambling algorithms at the same time, at all times.

In a presently preferred embodiment, this is accomplished by implementing the cipher text scramble module 20 and the cipher text descramble module 24 as complementary state machines, and by implementing the plain text scramble module 26 and the plain text descramble module 22 as complementary state machines. Each pair of complementary state machines will cycle through a plurality of different complementary states corresponding to a plurality of different bit-scrambling/descrambling algorithms, e.g., on successive power-up cycles of the digital television receiver 10. Preferably, the state machines are configured to have a large number of states, so that they do not "wrap around" and repeat the same pattern of states in a short period of successive power-up cycles. This is because once an attacker has determined the pattern, it becomes a routine matter for the attacker to power-up the state machine the requisite number x of times to cycle the state machine to a particular state. In the exemplary embodiment depicted in FIG. 1, in which the interconnect between the decryption engine 12 and the system decoder 14 is comprised of a pair of 16-bit wide parallel data busses 16, 18, there are, in theory, $2^{16}$ different possible bit patterns (and thus, $2^{16}$ possible states of the respective state machines) which could be invoked in order to scramble the order (position) of the bits of the 2-byte words carried by the 16-bit wide parallel data busses 16, 18.

In operation, the state machines are identical. Each state machine has the same initialization vector. When the power is cycled, the next state in the state machine is realized. Since the decryption engine 12 and the system decoder 14 are coupled to a common power supply, they are power-cycled together, so that the state machines in each the decryption engine 12 and the system decoder 14 are intrinsically synchronized. The output of each state machine (for a given input) is dependent upon the current state of that state machine. Thus, the bit-scrambling/descrambling algorithm executed by each state machine is dependent upon its current state (or seed state).

Thus, the requirement that the cipher text scramble module 20 of the system decoder 14 and the cipher text descramble module 24 of the decryption engine 12 be synchronized in such a manner as to run the complementary bit-scrambling/descrambling algorithms at the same time, at all times, and that the plain text scramble module 26 of the decryption engine 12 and the plain text descramble module 22 of the system decoder 14 be synchronized in such a manner as to run the complementary bit-scrambling/descrambling algorithms at the same time, at all times, can be easily satisfied by configuring the cipher text scramble module 20 state machine and the cipher text descramble module 24 state machine to cycle through the same number of complementary states during successive power-up cycles, and by configuring the plain text scramble module 26 and the plain text descramble module 22 to cycle through the same number of complementary states during successive power-up cycles.

If, for whatever reason, the decryption engine 12 powers up and the system decoder 14 does not, or vice versa, then the interface therebetween will be "out of sync", thereby preventing any communication therebetween. If this occurs, it is preferable that this "out of sync" status not be correctable by any means (hardware or software) within the system, since this would compromise the cryptographical security of the system.

In further accordance with the present invention, the following four additional anti-piracy measures can be taken in order to increase the difficulty and cost-to-reward ratio of attacking the system:

(1) using ball grid array (BGA) packages for packaging the decryption engine 12 and system decoder 14 chips. This is because BGA packages limit access to the IC pins, and also, because BGA packages are difficult to remove from the system board once surface-mounted to the board. Thus, the use of BGA packages renders it difficult for the would-be attacker to remove the ICs from the board and place them in a socket to access the pins. This greatly increases the difficulty of reverse engineering the device;

(2) using buried vias to connect board routes to the packages, thus limiting access to the bus data signals;

(3) using at least one power plane (e.g., an all copper layer in a multi-layer board) under the decryption engine 12 and the system decoder 14 to prevent viewing of traces on inside layers. In order to attempt to view the traces on the inside layers of the multi-layer board, a would-be attacker would have to drill through the power plane layer. This would cause short-circuiting which would render the entire device inoperative, thus defeating the attack;

(4) use an epoxy to encapsulate the BGA packages of both the decryption engine 12 and the system decoder 14, thus making non-destructive access to the respective ICs difficult; and, (5) use available masking techniques of ASIC technology to obscure the scramble module circuitry layout, thereby increasing the difficulty of reverse engineering the circuit, and the "seed states" from inspecting the ASIC layout with a Scanning Electron Microscope.

Although preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

For example, although the present invention has been described above in connection with an interconnect comprised of parallel data busses 16 and 18, the present invention is equally applicable to a digital receiver which has an interconnect comprised of serial data busses. Further, although the present invention has been described above in connection with a digital television receiver 10, it should be clearly understood that the present invention is equally applicable to any type of digital receiver. Moreover, it should be understood that compressed digital video bit-streams which comply with the MPEG-2 specification, e.g., the ATSC standard, encompass a large variety of data, including, without limitation, video, audio, text, voice, data, graphics, image, and other types of multimedia data.

Further enhancements of the bit-scrambling/descrambling scheme can be made in order to further enhance the cryptographical security of the system. For example, in addition to or in lieu of scrambling the position of the bits on the parallel data busses 16, 18, each of the bits can be delayed by a variable time period (e.g., by a variable number of clock cycles). This type of bit-scrambling may be thought of as temporal bit-scrambling.

Further, the serial order of the successive bits of the bitstream presented to each of the parallel data lines of the data busses 16 and 18 can likewise be scrambled. Also, rather than implementing the cipher text scramble module 20, the cipher text descramble module 24, the plain text scramble module 26, and the plain text descramble module 22 as state machines, these modules could be implemented as signal processing circuits under the control of respective state machines, with the output of the state machines being utilized as control signals. For example, the output of the state machines could be used as addresses to look-up different bit patterns (bit position combinations) stored in a read-only (ROM), or as seed states for linear feedback shift registers (LFSR's) generating bit patterns. Alternatively, the output of the state machines could be transformed by the respective signal processing circuits in order to produce the final bitstreams.

What is claimed is:

1. A method for providing a secure interface between a decryption engine and a system decoder of a digital receiver in which the system decoder receives an encrypted bitstream and produces a cipher text bitstream which is supplied to the decryption engine via a first parallel data bus which includes a plurality N of parallel bit lines corresponding to respective N bits of the cipher text bitstream, and in which the decryption engine decrypts the cipher text bitstream and produces a plain text bitstream which is supplied to the system decoder via a second parallel data bus which includes a plurality N of parallel bit lines corresponding to respective N bits of the plain text bitstream, and wherein the method includes the steps of:

scrambling the bit order of the N bits of the cipher text bitstream on the respective N bit lines of the first data bus, to thereby produce a scrambled cipher text bitstream N-bits wide;

descrambling the bit order of the N bits of the scrambled cipher text bitstream, to thereby produce a descrambled cipher text bitstream which is the same as the original cipher text bitstream;

employing the decryption engine to decrypt the descrambled cipher text bitstream, to thereby produce the plain text bitstream, scrambling the bit order of the N bits of the plain text bitstream on the respective N bit lines of the second data bus, to thereby produce a scrambled plain text bitstream N-bits wide; and, descrambling the bit order of the N bits of the scrambled plain text bitstream, to thereby produce a descrambled plain text bitstream which is the same as the original plain text bitstream.

2. The method as set forth in claim 1, wherein the digital receiver comprises a digital television receiver.

3. The method as set forth in claim 1, wherein:

the step of scrambling the bit order of the N bits of the cipher text bitstream is performed in accordance with a first bit-scrambling algorithm; and, the step of scrambling the bit order of the N bits of the plain text bitstream is performed in accordance with a second bit-scrambling algorithm.

4. The method as set forth in claim 3, wherein the first and second bit-scrambling algorithms are the same.

5. The method as set forth in claim 3, wherein the first and second bit-scrambling algorithms are different.

6. The method as set forth in claim 3, wherein the first bit-scrambling algorithm is a selected one of a plurality of different possible first bit-scrambling algorithms for each separate power-up cycle of the digital receiver.

7. The method as set forth in claim 3, wherein the first bit-scrambling algorithm is a different one of a plurality of possible first bit-scrambling algorithms for each of a plurality of successive power-up cycles of the digital receiver.

8. The method as set forth in claim 3, wherein the second bit-scrambling algorithm is a selected one of a plurality of different possible second bit-scrambling algorithms for each separate power-up cycle of the digital receiver.

9. The method as set forth in claim 3, wherein the second bit-scrambling algorithm is a different one of a plurality of possible second bit-scrambling algorithms for each of a plurality of successive power-up cycles of the digital receiver.

10. The method as set forth in claim 3, wherein:

the step of descrambling the bit order of the N bits of the scrambled cipher text bitstream is performed in accordance with a first bit-descrambling algorithm which is the inverse of the first bit-scrambling algorithm; and, the step of descrambling the bit order of the N bits of the scrambled plain text bitstream is performed in accordance with a second bit-descrambling algorithm which is the inverse of the second bit-scrambling algorithm.

11. The method as set forth in claim 10, wherein:

the step of scrambling the bit order of the N bits of the cipher text bitstream is synchronized with the step of descrambling the bit order of the N bits of the scrambled cipher text bitstream; and, the step of scrambling the bit order of the N bits of the plain text bitstream is synchronized with the step of descrambling the bit order of the N bits of the scrambled plain text bitstream.

12. A digital receiver, comprising:

a system decoder for receiving an encrypted bitstream and producing a cipher text bitstream;

a decryption engine for decrypting the cipher text bitstream and producing a plain text bitstream;

a first parallel data bus which includes a plurality N of parallel bit lines coupled between a parallel output port of said system decoder and a parallel input port of said decryption engine;

a second parallel data bus which includes a plurality N of parallel bit lines coupled between a parallel output port of said decryption engine and a parallel input port of said system decoder;

means for scrambling the bit order of N bits of the cipher text bitstream on the N bit lines of the first data bus, to thereby produce a scrambled cipher text bitstream N-bits wide which is supplied to said parallel input port of said decryption engine via said first parallel data bus, means for descrambling the bit order of the N bits of the scrambled cipher text bitstream, to thereby produce a descrambled cipher text bitstream which is the same as the original cipher text bitstream;

means for scrambling the bit order of N bits of the plain text bitstream on the N bit lines of the second data bus, to thereby produce a scrambled plain text bitstream N-bits wide which is supplied to said parallel input port of said system decoder via said second parallel data bus; and, means for descrambling the bit order of the N bits of the scrambled plain text bitstream, to thereby produce a descrambled plain text bitstream which is the same as the original plain text bitstream.

13. The digital receiver as set forth in claim 12, wherein the digital receiver comprises a digital television receiver.

14. The digital receiver as set forth in claim 12, wherein:

said means for scrambling the bit order of N bits of the cipher text bitstream comprises a cipher text scramble module incorporated within said system decoder;

said means for descrambling the bit order of the N bits of the scrambled cipher text bitstream comprises a cipher text descramble module incorporated within said decryption engine;

said means for scrambling the bit order of N bits of the plain text bitstream comprises a plain text scramble module incorporated within said decryption engine; and, said means for descrambling the bit order of the N bits of the scrambled plain text bitstream comprises a plain text descramble module incorporated within said system decoder.

15. The digital receiver as set forth in claim 14, wherein said first and second parallel data busses are at least partially exposed to the outside world.

16. The digital receiver as set forth in claim 15, wherein said system decoder and said decryption engine are embodied in separate first and second chips.

17. The digital receiver as set forth in claim 16, further comprising first and second ball grid array packages for packaging said first and second chips.

18. The digital receiver as set forth in claim 17, wherein said first and second ball grid array packages are surface-mounted on a system board.

19. The digital receiver as set fourth in claim 18, wherein said system board includes board routes on inner signal layers thereof and buried vias for connecting said board routes to said first and second ball grid array packages.

20. The digital receiver as set forth in claim 19, wherein said board is a multi-layer board which includes at least one power plane disposed between said first and second ball grid array packages and inside layers of said multi-layer board.

21. The digital receiver as set forth in claim 17, wherein said first and second ball grid array packages are encapsulated in epoxy.

22. The digital receiver as set forth in claim 16, wherein said first and second chips are mounted on a multi-layer system board which includes at least one power plane disposed between said first and second chips and inside layers of said multi-layer board.

23. The digital receiver as set forth in claim 16, wherein said first and second chips are mounted on a multi-layer system board which includes at least one power plane disposed between the back of said multi-layer board, and those layers of said multi-layer board carrying traces of the signals between said first and second chips.

24. The digital receiver as set forth in claim 14, wherein said cipher text scramble module and said cipher text descramble module comprise complementary first and second state machines, respectively.

25. The digital receiver as set forth in claim 24, wherein said plain text scramble module and said plain text descramble module comprise complementary third and fourth state machines, respectively.

26. The digital receiver as set forth in claim 25, wherein:

said system decoder and said decryption engine are coupled to a common power source and are power-cycled together;

said first and second state machines synchronously cycle through respective sequences of complementary first and second states over a plurality of successive power-up cycles; and, said third and fourth state machines synchronously cycle through respective sequences of complementary third and fourth states over a plurality of successive power-up cycles.

27. The digital receiver as set forth in claim 25, wherein:

said cipher text scramble module scrambles the bit order of N bits of the cipher text bitstream on the N bit lines of the first data bus in accordance with a first bit-scrambling algorithm; and, said plain text scramble module scrambles the bit order of N bits of the plain text bitstream on the N bit lines of the second data bus in accordance with a second bit-scrambling algorithm.

28. The digital receiver as set forth in claim 27, wherein said first and second bit-scrambling algorithms are the same.

29. The digital receiver as set forth in claim 27, wherein said first and second bit-scrambling algorithms are different.

30. The digital receiver as set forth in claim 27, wherein said first bit-scrambling algorithm is a selected one of a plurality of different possible first bit-scrambling algorithms for each separate power-up cycle of the digital receiver, wherein said plurality of different possible first bit-scrambling algorithms correspond to different states of said first state machine.

31. The digital receiver as set forth in claim 27, wherein said first bit-scrambling algorithm is a different one of a plurality of possible first bit-scrambling algorithms for each of a plurality of successive power-up cycles of the digital receiver, wherein said plurality of possible first bit-scrambling algorithms correspond to different states of said first state machine.

32. The digital receiver as set forth in claim 27, wherein said second bit-scrambling algorithm is a selected one of a plurality of different possible second bit-scrambling algorithms for each separate power-up cycle of the digital receiver, wherein said plurality of different possible second bit-scrambling algorithms correspond to different states of said third state machine.

33. The method as set forth in claim 27, wherein said second bit-scrambling algorithm is a different one of a plurality of possible second bit-scrambling algorithms for each of a plurality of successive power-up cycles of the digital receiver, wherein said plurality of possible second bit-scrambling algorithms correspond to different states of said third state machine.

34. The method as set forth in claim 27, wherein:

said cipher text descramble module scrambles the bit order of the N bits of the scrambled cipher text bitstream on the N bit lines of the first data bus in accordance with a first bit-descrambling algorithm which is the inverse of the first bit-scrambling algorithm; and, said plain text descramble module scrambles the bit order of N bits of the scrambled plain text bitstream on the N bit lines of the second data bus in accordance with a second bit-descrambling algorithm which is the inverse of the second bit-scrambling algorithm.

35. The digital receiver as set forth in claim 14, wherein:

said cipher text scramble module scrambles the bit order of N bits of the cipher text bitstream on the N bit lines of the first data bus in accordance with a first bit-scrambling algorithms; and, said plain text scramble module scrambles the bit order of N bits of the plain text bitstream on the N bit lines of the second data bus in accordance with a second bit-scrambling algorithm.

36. The method as set forth in claim 35, wherein:

said cipher text descramble module scrambles the bit order of the N bits of the scrambled cipher text bitstream on the N bit lines of the first data bus in accordance with a first bit-descrambling algorithm which is the inverse of the first bit-scrambling algorithm; and, said plain text descramble module scrambles the bit order of N bits of the scrambled plain text bitstream on the N bit lines of the second data bus in accordance with a second bit-descrambling algorithm which is the inverse of the second bit-scrambling algorithm.

37. The digital receiver as set forth in claim 35, wherein said first and second bit-scrambling algorithms are the same.

38. The digital receiver as set forth in claim 35, wherein said first and second bit-scrambling algorithms are different.

39. The digital receiver as set forth in claim 35, wherein said first bit-scrambling algorithm is a selected one of a plurality of different possible first bit-scrambling algorithms for each separate power-up cycle of the digital receiver.

40. The digital receiver as set forth in claim 35, wherein said first bit-scrambling algorithm is a different one of a plurality of possible first bit-scrambling algorithms for each of a plurality of successive power-up cycles of the digital receiver.

41. The digital receiver as set forth in claim 35, wherein said second bit-scrambling algorithm is a selected one of a plurality of different possible second bit-scrambling algorithms for each separate power-up cycle of the digital receiver.

42. The method as set forth in claim 35, wherein said second bit-scrambling algorithm is a different one of a plurality of possible second bit-scrambling algorithms for each of a plurality of successive power-up cycles of the digital receiver.

43. A digital receiver, comprising:

a system decoder for receiving an encrypted bitstream and producing a cipher text bitstream;

a decryption engine for decrypting the cipher text bitstream and producing a plain text bitstream;

a first data bus coupled between a parallel output port of said system decoder and a parallel input port of said decryption engine;

a second data bus coupled between a parallel output port of said decryption engine and a parallel input port of said system decoder;

means for scrambling the cipher text bitstream to thereby produce a scrambled cipher text bitstream which is supplied to said parallel input port of said decryption engine via said first data bus; and, means for descrambling the scrambled cipher text bitstream to thereby produce a descrambled cipher text bitstream which is the same as the original cipher text bitstream;

means for scrambling the plain text bitstream to thereby produce a scrambled plain text bitstream which is supplied to said parallel input port of said system decoder via said second data bus; and, means for descrambling the scrambled plain text bitstream to thereby produce a descrambled plain text bitstream which is the same as the original plain text bitstream.

44. The digital receiver as set forth in claim 43, wherein:

said first data bus comprises a first parallel data bus which includes a plurality N of parallel bit lines;

said second data bus comprises a second parallel data bus which includes a plurality N of parallel bit lines;

said means for scrambling the cipher text bitstream scrambles the bit positions of N bits of the cipher text bitstream on the N bit lines of said first data bus; and, said means for scrambling the plain text bitstream scrambles the bit positions of N bits of the plain text bitstream on the N bit lines of said second data bus.

45. The digital receiver as set forth in claim 44, further comprising:

means for scrambling serial bit positions of N bits of the cipher text bitstream; and, means for scrambling serial bit positions of N bits of the plain text bitstream.

46. The digital receiver as set forth in claim 45, further comprising:

means for delaying each of N bits of the cipher text bitstream by a variable time period; and, means for delaying each of N bits of the plain text bitstream by a variable time period.

47. The digital receiver as set forth in claim 44, further comprising:

means for delaying each of N bits of the cipher text bitstream by a variable time period; and, means for delaying each of N bits of the plain text bitstream by a variable time period.

48. The digital receiver as set forth in claim 43, wherein:

said means for scrambling the cipher text bitstream scrambles serial bit positions of N bits of the cipher text bitstream; and, said means for scrambling the plain text bitstream scrambles serial bit position of N bits of the plain text bitstream.

49. The digital receiver as set forth in claim 48, further comprising:

means for delaying each of N bits of the cipher text bitstream by a variable time period; and, means for delaying each of N bits of the plain text bitstream by a variable time period.

50. The digital receiver as set forth in claim 43, wherein:

said means for scrambling the cipher text bitstream delays each of N bits of the cipher text bitstream by a variable time period; and, said means for scrambling the plain text bitstream delays each of N bits of the plain text bitstream by a variable time period.

* * * * *